United States Patent [19]

Kingman et al.

[11] 4,061,353
[45] Dec. 6, 1977

[54] TRANSPORT LOCK FOR LIFT BED TRAILER

[75] Inventors: Stephen A. Kingman, Rensselaer; Leslie A. Weaver, Monon, both of Ind.

[73] Assignee: Eugene A. LeBoeuf, Gary, Ind.

[21] Appl. No.: 650,669

[22] Filed: Jan. 20, 1976

[51] Int. Cl.² .................................... B62D 21/02
[52] U.S. Cl. .............................. 280/106 T; 214/512; 280/43.17; 280/423 R
[58] Field of Search ............ 280/106 T, 43.12, 43.17, 280/414 R, 423 R, 656; 214/512, 515, 516, 501, 502

[56] References Cited
U.S. PATENT DOCUMENTS

| 2,596,838 | 5/1952 | Carver | 214/515 |
| 2,670,866 | 3/1954 | Glesby | 214/515 |
| 3,362,552 | 1/1968 | Thiele | 214/515 |
| 3,737,061 | 6/1973 | Glumac | 214/515 |
| 3,747,788 | 7/1973 | Petetin | 214/515 |
| 3,819,076 | 6/1974 | Ochler | 280/656 |
| 3,861,716 | 1/1975 | Baxter | 280/423 R |

Primary Examiner—Joseph F. Peters, Jr.
Assistant Examiner—John A. Carroll
Attorney, Agent, or Firm—Edward W. Osann, Jr.

[57] ABSTRACT

A lift bed highway trailer adapted to be coupled to a tractor to transport heavy loads through use of pallet frame units that can be quickly picked up and discharged at any point, including an improved power actuated mechanism in the trailer gooseneck structure and in the suspension subframe for positively locking the liftable bed in the raised transport position.

15 Claims, 12 Drawing Figures

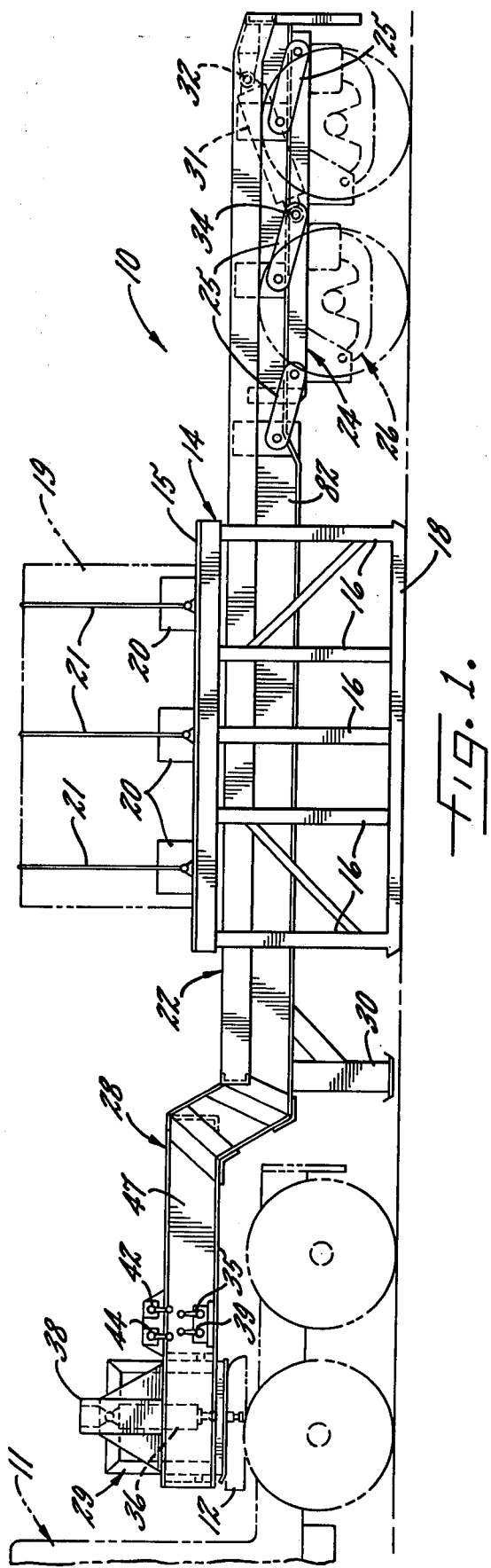
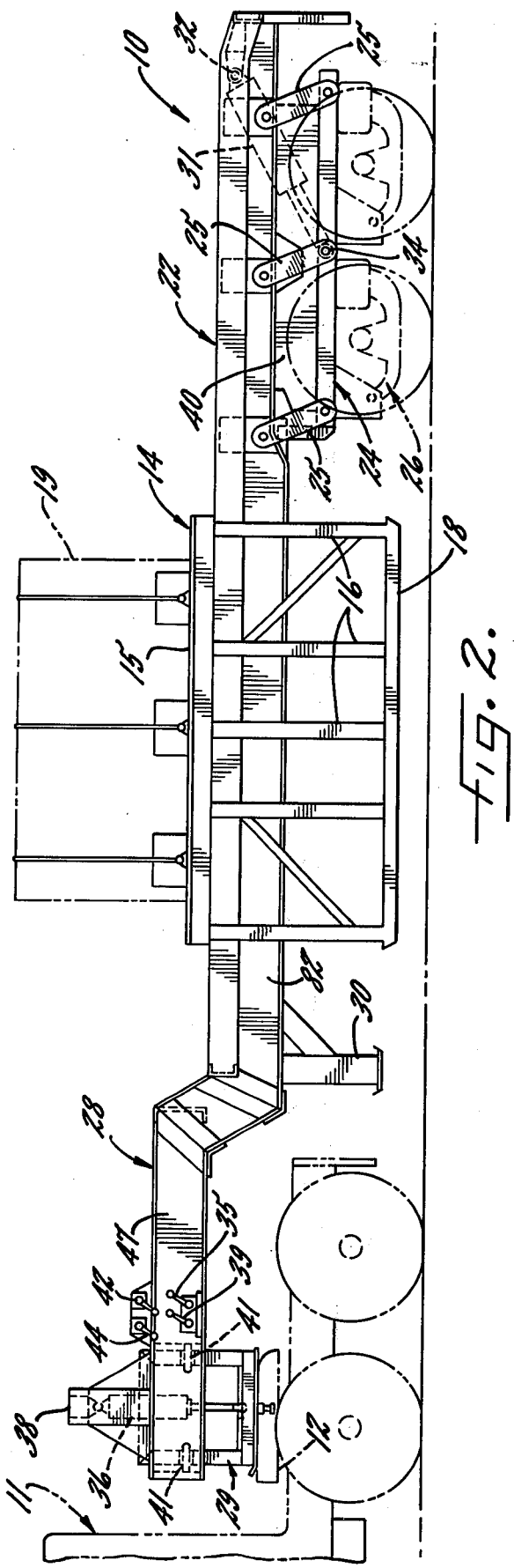

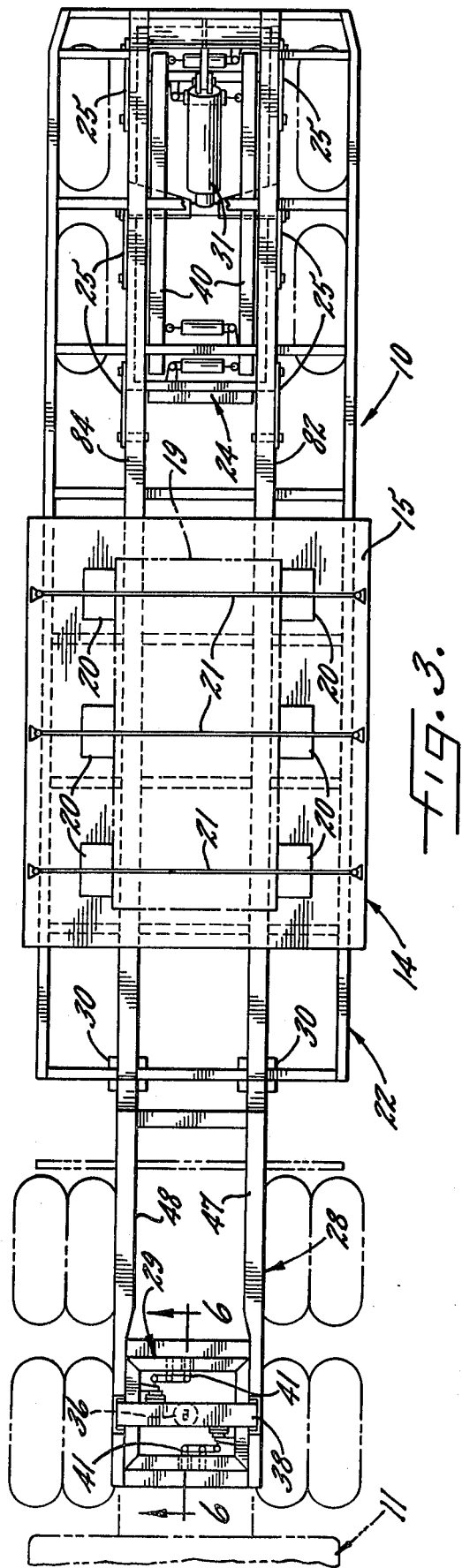
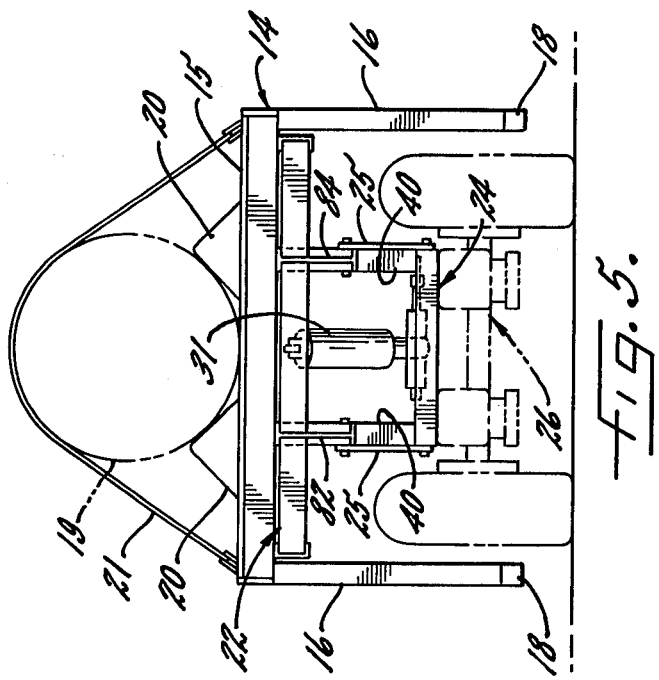
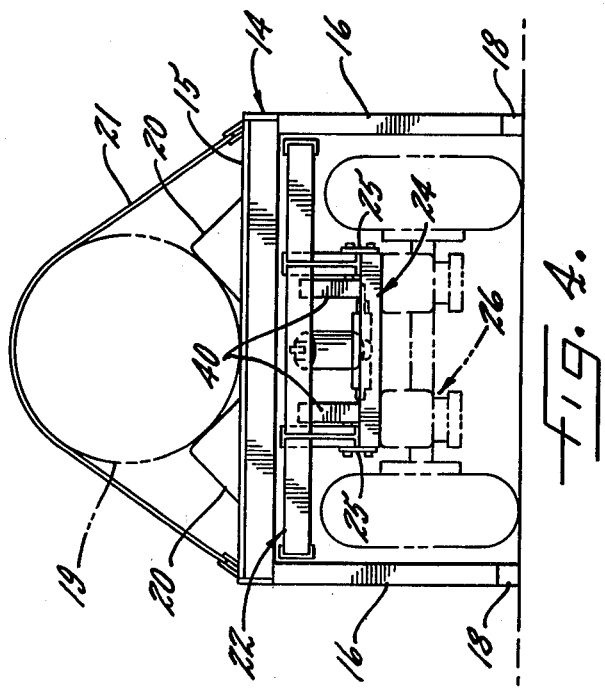

TRANSPORT LOCK FOR LIFT BED TRAILER

DESCRIPTION OF THE INVENTION

The present invention relates to lift bed vehicles of the type adapted to transport heavy loads through the use of pallet frame units that can be quickly picked up and discharged at any desired point. The use of such pallet frame units permits quick separation of the load from the vehicle without waiting for additional equipment or personnel, thereby maximizing the availability of the vehicle for transport rather than storage. More specifically, the invention relates to a lift bed highway trailer adapted to be coupled to a tractor by the usual fifth wheel connection and utilizing pallet frame units in transporting heavy loads. The term "highway trailer", as used herein, is intended to include various "off the road" applications where the trailer is used in an industrial complex such as a steel mill or manufacturing plant.

One object of the invention is to provide a lift bed trailer of the character set forth above including quick acting, positive locking devices for maintaining the trailer bed in raised transport position with maximum safety.

Another object of the invention is to provide a lift bed trailer of the foregoing type wherein the transport locking device may be engaged as an incident to elevating the trailer bed to, or slightly through, its raised transport position.

A further object is to provide a lift bed trailer of the above character wherein the locking device may be readily controlled from a station on, or in close proximity to, the tractor.

Other objects and advantages will become apparent as the following description proceeds, taken together with the accompanying drawings, in which:

FIG. 1 is a side elevational view of a lift bed trailer embodying the present invention, the trailer being in lowered position and backed under a loaded pallet frame unit preparatory to picking it up;

FIG. 2 is a view similar to FIG. 1 but showing the lift bed trailer and load in raised or transport position with the loaded pallet frame unit in place thereon;

FIG. 3 is a plan view of the lift bed trailer and load as illustrated in FIG. 1;

FIG. 4 is an end elevational view of the trailer and load as shown in loading position in FIG. 1; and FIG. 5 is an end elevational view of the trailer and load as shown in transport position in FIG. 2.

Figure 6:
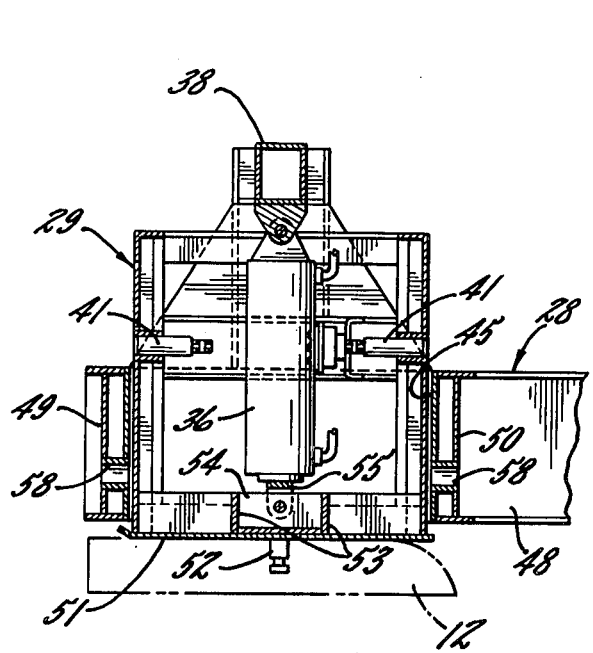
FIG. 6 is an enlarged vertical sectional view taken through the jackbox in the plane of the line 6—6 in FIG. 3 with the trailer in lowered position.

While the invention is susceptible of various modifications and alternative constructions, a certain illustrative embodiment has been shown in the drawings and will be described below in considerable detail. It should be understood, however, that there is no intention to limit the invention to the specific form described but, on the contrary, the intention is to cover all modifications, alternative constructions and equivalents falling within the scope of the appended claims.

Referring more specifically to FIG. 1, the invention is there exemplified in an illustrative lift bed trailer 10 arranged to be coupled to a tractor 11 by means of a conventional fifth wheel connection 12. The trailer 10 is adapted to transport heavy loads through the use of one or more pallet frame units 14 that can be quickly picked up and quickly discharged at any desired point, thus maximizing the availability of the trailer for transport rather than storage. The pallet frame unit 14 is designed to straddle the bed of the trailer and the latter, when in loading or unloading position, may be moved freely under the unit 14.

The pallet frame unit 14 in this instance is fashioned as a weldment comprising a load carrying platform 15 supported on two laterally spaced sets of legs 16. Each set has a ground engaging skid 18 fixed to the lower ends of the legs. The skid and legs are made from relatively heavy steel tubing of square or rectangular cross section, while the platform 15 may be formed by transverse I-beams and appropriate steel or wood decking. The two sets of legs 16 are spaced a sufficient distance apart to straddle the trailer bed, with adequate clearance on each side to permit the trailer to be easily backed under the platform 15. The latter may, for example, support a steel coil 19 thereon by means of chocks 20 and tie-down bands or chains 21. The coil 19 may weigh up to 50,000 pounds.

The trailer 10 comprises a liftable main frame or bed 22 of generally rectangular configuration and constructed of relatively heavy steel structural members. The main frame 22 is connected at its rearward end to a subframe 24 by a plurality of pivot arms 25. The subframe 24 is ground supported through an underlying wheeled suspension 26. The forward end of the main frame 22 is rigidly fixed to a gooseneck 28 which includes a jackbox 29 adapted to engage the fifth wheel of the tractor 11. The forward end of the main frame 22 also includes a pair of landing legs 30 for supporting it when the trailer is detached from the tractor.

For the purpose of shifting the main frame 22 of the trailer between a lowered loading and unloading position (FIGS. 1 and 4), and a raised transport position (FIGS. 2 and 5), the trailer 10 is provided with a pair of independent hydraulic actuators of the conventional double acting type. These include hydraulic actuator 31 connected between a pivot point 32 on the main frame 22 and a pivot point 34 on the subframe 24. The actuator 31 is operated from the hydraulic system of the tractor by means of control valve 35 on the gooseneck and is adapted to raise and lower the rearward end portion of the main frame 22. The other actuator 36 is interposed between the bottom of the jackbox 29 and a yoke 38 fixed to the upper portion of the gooseneck 28, the jackbox and gooseneck being vertically movable relative to each other. The actuator 36 is operated from the hydraulic system of the tractor by means of control valve 39 also located on the gooseneck and is adapted to raise and lower the forward end portion of the main frame.

Provision is made in the trailer 10 for positively and safely locking the main frame 22 in raised transport position by the use of quick acting, power actuated locking mechanisms including devices 40, 41 in the trailer subframe 24 and in the gooseneck structure 28. The locking mechanism in the suspension subframe 24 is controlled by valve 42 on the gooseneck, while the locking mechanism in the gooseneck structure is controlled by the valve 44, also on the gooseneck. Power for both mechanisms is supplied by the compressed air system of the tractor.

Figure 7:
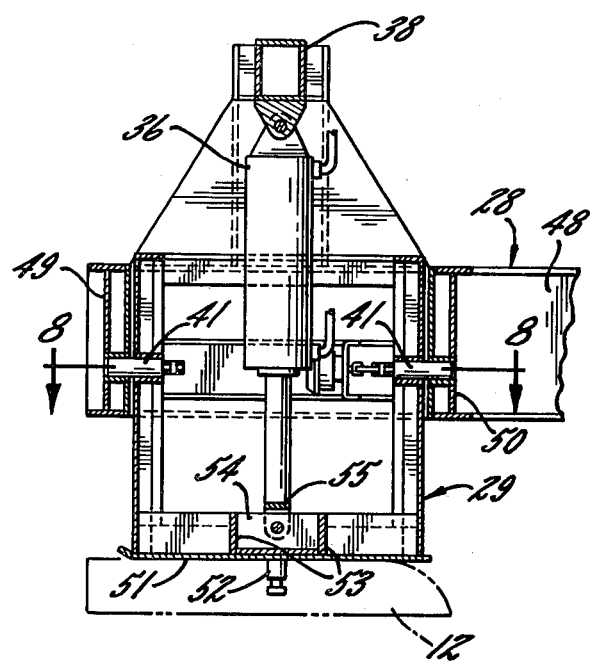
FIG. 7 is a vertical sectional view similar to FIG. 6 but with the trailer in raised transport position.
Figure 8:
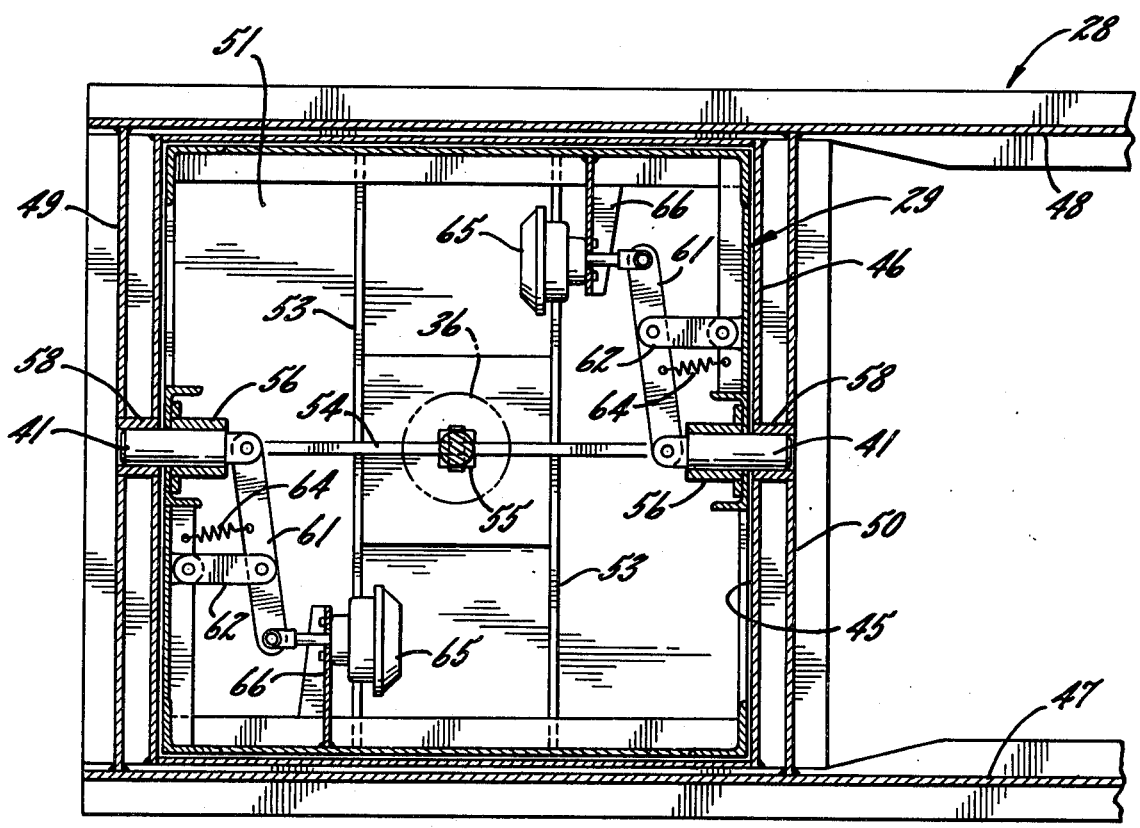
FIG. 8 is a further enlarged horizontal sectional view taken through the jackbox in the plane of the line 8—8 in FIG. 7.

Referring more specifically to the locking mechanism of the gooseneck structure, (FIGS. 6–8), it will be noted that the gooseneck 28 is fashioned adjacent its forward end with a large rectangular opening 45 which telescopically houses the jackbox 29. The opening 45 is in this instance defined by an open box liner 46 consisting of four side walls secured between longitudinal I-beam members 47, 48 of the gooseneck and transverse struts 49, 50. The jackbox 29 has a bottom plate 51 with a depending connecting pin 52 and rests on the tractor fifth wheel 12. The upper side of the plate 51 is provided with a number of reinforcing ribs 53, 54, the latter serving as an anchorage for the lower end 55 of the piston rod of hydraulic actuator 36.

The upper half of the jackbox 29 (FIGS. 6–8) includes the locking devices 41 in the form of a pair of shot pins disposed in the longitudinal center plane of the trailer and adapted to be moved outwardly or inwardly in opposite directions from the jackbox. The shot pins 41 are slidably mounted in bushings 56 attached respectively to the front and rear walls of the jackbox. Mounted outside the front and rear walls of the jackbox and disposed for registration and engagement with the shot pins are a pair of bushings 58 fixed to the jackbox liner 46 and to the forward and rearward transverse struts 49, 50, respectively. Each shot pin is attached to one end of a rocker arm 61 which is fulcrumed intermediate its ends on a pivot link 62. A tensile spring 64 secured at one end to the rocker arm and at the other to the inside of the jackbox wall serves to bias each shot pin toward an outwardly extending, or normally engaged, position. Withdrawal of the shot pins inwardly of the jackbox in opposition to the biasing springs 64 is effected by means of a pair of actuators 65, mounted respectively on brackets 66 projecting into the interior of the jackbox. The air actuators 65 are under the control of the valve 44 on the gooseneck.

To operate the locking mechanism in the gooseneck structure, and with the trailer in lowered position as shown in FIG. 6, the control valve 44 is turned to admit pressurized air to the actuators 65, thus retracting the shot pins 41 inwardly of the jackbox. The hydraulic actuator 36, as well as the rearward hydraulic actuator 31, is then energized to commence lifting the trailer bed 22 toward transport position. As soon as the transverse struts 49, 50 cover the ends of the retracted shot pins, the lever 44 is shifted to release the air from the actuators. With continued upper motion of the trailer bed and gooseneck, the ends of the shot pins, under the bias of the springs 64, ride along the opposed surfaces of the gooseneck liner 46 until they register with the bushings 58 of the transverse struts. At that point, the shot pins snap into full engagement with the strut bushings 58 under the force of their biasing springs 64, securely locking the forward portion of the trailer bed and gooseneck in raised transport position.

Figure 10:
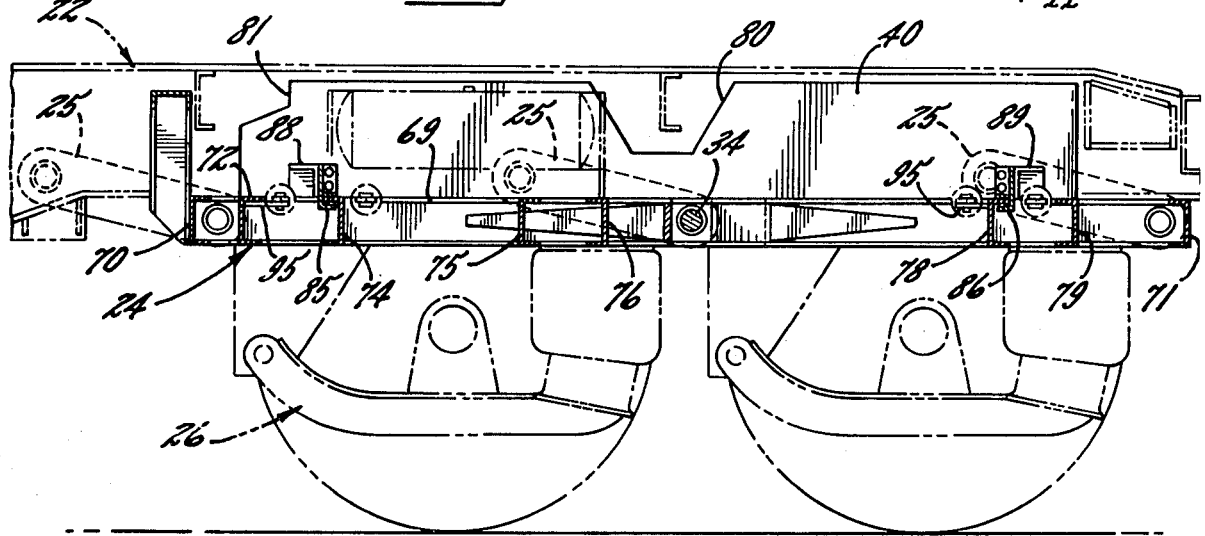
FIG. 10 is a vertical sectional view taken longitudinally through the suspension subframe in the plane of the line 10—10 in FIG. 9.
Figure 11:
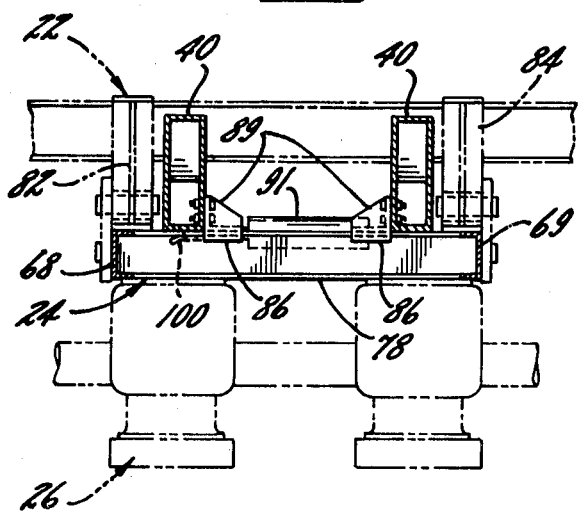
FIG. 11 is a vertical sectional view taken transversely through the suspension subframe and locking devices in the plane of the line 11—11 in FIG. 9, with the locking devices in retracted position.
Figure 12:
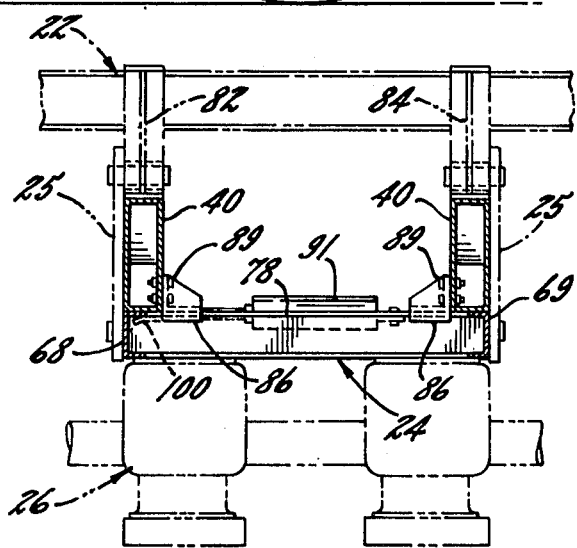
FIG. 12 is a view similar to FIG. 11 but with the locking devices in extended position.

Turning next to the locking mechanism of the suspension subframe 24 (FIGS. 4, 5, 9–12), it will be noted that the latter includes the locking devices 40 which in this case are a pair of longitudinally disposed lift spacers situated in laterally spaced relation on the top surface of the subframe 24. This surface is defined by the upper horizontal flanges of the subframe side channels 68, 69, end channels 70, 71, and transverse channels 72, 74, 75, 76, 78, 79. The lift spacers 40 are substantially identical but of opposite hand, i.e., the one on the right as shown in FIGS. 11 and 12 is the right hand spacer and the remaining one is the left hand spacer. In order to avoid the various transverse structural elements of the liftable main frame 22, each of the lift spacers 40 is formed with a deep central clearance notch 80 and a somewhat smaller forward clearance notch 81.

Figure 9:
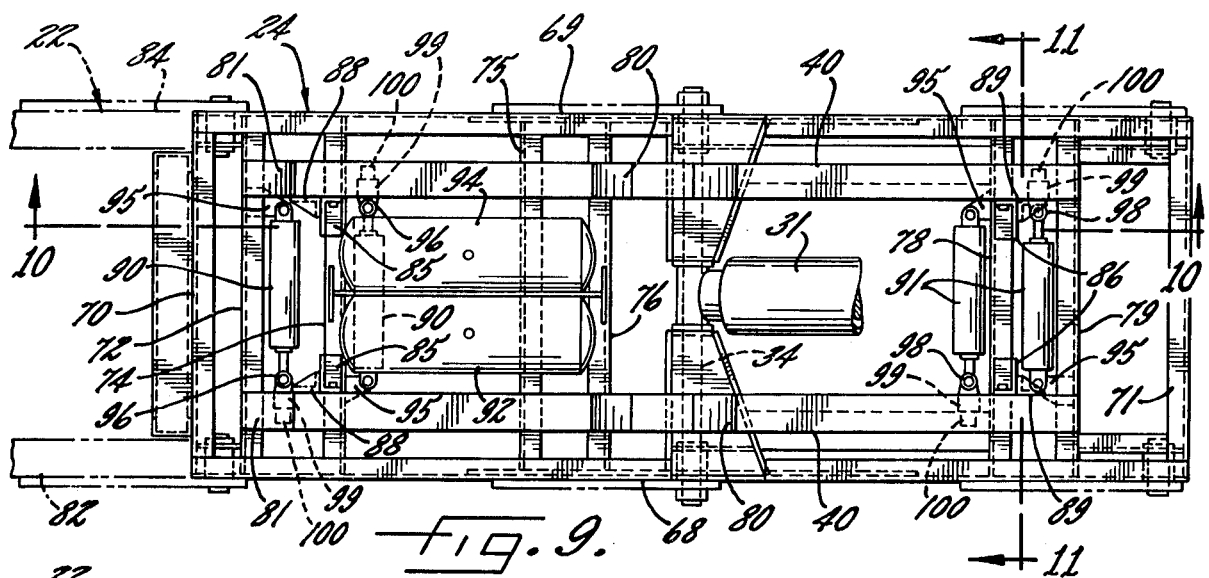
FIG. 9 is a further enlarged plan view of the suspension subframe and the transport locking devices of the trailer shown in FIG. 1.

The lift spacers 40 are adapted to be laterally shifted between an inboard or retracted position, shown in FIG. 9 and in solid lines in FIG. 11, and an outboard or extended position, shown in solid lines in FIG. 12. In the extended position, the spacers 40 overlie the side channels 68, 69 of the subframe 24 and underlie fore and aft I-beams 82, 84 of the liftable main frame 22 to support the latter in raised transport position. In their retracted position, the spacers 40 remain clear of the main frame I-beams 82, 84 when the main frame is in lowered position for loading and unloading. Each of the lift spacers 40 is closely guided during its lateral movement, and restrained against longitudinal movement by a pair of opposed linear guide shoes 85, 86 secured to the spacer by brackets 88, 89, respectively. Each such shoe is of generally U-shaped cross section so as to nest with and slide along the top flange of a transverse subframe channel. Referring, for example, to the right hand spacer 40 as shown in FIGS. 9 and 10, it will be seen that its forward guide shoe 85 rides along the top flange of transverse channel 74, while its rear guide shoe 86 similarly engages the top flange of the transverse channel 78. In like manner, the guide shoes 85, 86 of the left hand spacer 40 also slidingly engage the top flange of channel 74 and channel 78, respectively.

For the purpose of shifting the lift spacers 40 laterally, each spacer has associated therewith a pair of actuators 90, 91 (FIG. 9) under the control of valve 42. The actuators are powered from the compressed air system of the tractor and the circuit may include accumulator tanks 92, 94 (shown in phantom lines in FIG. 9) mounted within the liftable frame 22 of the trailer. Each of the actuators 90, 91 is attached at its cylinder end to a supporting bracket 95 carried by the transverse subframe members 72, 74, 78, 79. The opposite or piston rod end 96, 98 of each actuator is attached to one of the lift spacers 40 by means of a bracket 99 secured to the underside of the lift spacer. Each bracket 99 extends to the longitudinal center plane of the lift spacer and includes a flared guide 100 on its lower end defining an opening facing toward the inwardly projecting flange of one of the suspension frame side members 68, 69. Upon energizing of the actuators 90, 91, this structure ultimately engages the in-turned edge of the top flange of the suspension frame side member. This flange then acts as a positive stop which locates the lift spacer 40 in properly aligned relation with the side member 68 or 69 of the suspension frame and the underlying fore and aft I-beam 82 or 84 of the main frame.

To operate this locking mechanism, the control valve 42 may be opened to admit air to the actuators 90, 91 and the latter will shift the spacers 40 outwardly into engagement with the edges of the lower flanges of the fore and aft I-beam members 82, 84 of the liftable main frame 22. Upon energizing the actuator 31 through the control valve 35, the frame 22 begins to elevate with respect to the suspension subframe 24. The inner edges of the lower flanges of the I-beams 82, 84 thus ride along the opposed faces of the lift spacers 40 until the frame 22 has been elevated through a distance ending slightly above its transport position. At that point, the spacers 40 snap outwardly under the force of their air actuators 90, 91 and into precise position for supporting the overlying I-beams 82, 84 of the lift bed. Actuation of the control valve 31 to lower the frame 22 slightly transfers the weight of the frame 22 and the load to the lift spacers 40 and to the underlying suspension. Due to the action of the guides 85, 86 and also the frictional effect, the spacers 40 remain in place throughout the transport operation and until the liftable frame 22 is elevated to clear the spacers 40 and the spacer actuators 90, 91 are energized to retract the spacers inwardly.

An alternate mode of operating the locking mechanism associated with the suspension subframe 24 is to elevate the liftable main frame 22 by use of control valve 35 and actuator 31 without energizing the lift spacer actuators 90, 91. After the main frame 22 has been elevated slightly above transport position the actuators 90, 91 may be energized by operating control valve 42, shifting the lift spacers 40 to extended position. The main frame 22 may then be lowered until the I-beams 82, 84 rest on the lift spacers 40, transferring the weight of the frame 22 and load to the spacers 40 and thence to the underlying suspension.

We claim as our invention:

1. In a lift bed highway trailer adapted for coupling to a tractor by means of a fifth wheel connection; the combination comprising:
   a. a liftable main frame having a lowered loading and unloading position and a raised transport position;
   b. a wheeled subframe underlying said main frame and pivotally connected to the same;
   c. a gooseneck fixed to the forward end of said main frame;
   d. a jackbox mounted within said gooseneck for vertical sliding movement relative thereto, said jackbox being adapted for attachment to the tractor fifth wheel;
   e. power lift means for moving said main frame and gooseneck between the lowered loading and unloading position and the raised transport position;
   f. a pair of lift spacers including linear guides mounted on said subframe for lateral sliding movement but constrained against longitudinal movement relative thereto;
   g. power actuator means for extending said lift spacers laterally against a positive stop to support said main frame in an elevated position; and
   h. a pair of power actuated shot pins mounted in said jackbox in axially spaced relation with each other adapted respectively to engage said gooseneck and lock same in the raised transport position.

2. In a highway trailer of the lift bed type adapted to be coupled to a tractor, the combination comprising:
   a. a liftable main frame having a lowered loading and unloading position and a raised transport position;
   b. a loaded pallet frame unit adapted to straddle said main frame;
   c. a subframe underlying said main frame and pivotally connected to same;
   d. a wheeled suspension underlying said subframe and adapted to serve as a ground support therefor;
   e. a gooseneck fixed to the forward end of said main frame and having a pair of longitudinal structural members and a pair of transverse structural members defining a jackbox opening therebetween;
   f. a jackbox mounted within said opening for vertical sliding movement relative to said gooseneck, said jackbox being adapted for attachment to the tractor fifth wheel;
   g. power lift means for moving said main frame and gooseneck between the lowered loading and unloading position and the raised transport position;
   h. a pair of lift spacers including linear guides mounted on said subframe for lateral sliding movement but constrained against longitudinal movement relative thereto;
   i. power actuator means for extending said lift spacers laterally against a positive stop to support said main frame in an elevated position; and
   j. a pair of power actuated shot pins mounted in said jackbox in axially spaced relation with each other adapted to be projected outwardly therefrom in opposite directions to engage said gooseneck transverse members and positively lock said gooseneck in raised transport position.

3. In a lift bed highway trailer adapted for coupling to a tractor by means of a fifth wheel connection; the combination comprising:
   a. a liftable main frame having a lowered loading and unloading position and a raised transport position;
   b. a wheeled subframe underlying said main frame and pivotally connected to the same;
   c. a gooseneck fixed to the forward end of said main frame;
   d. a jackbox mounted within said gooseneck for vertical sliding movement relative thereto, said jackbox being adapted for attachment to the tractor fifth wheel;
   e. power lift means for moving said main frame and gooseneck between the lowered loading and unloading position and the raised transport position; and
   f. a pair of power actuated shot pins disposed in the longitudinal center plane of the trailer, said shot pins being mounted in said jackbox in axially spaced relation with each other adapted respectively to engage said gooseneck and lock same in the raised transport position.

4. The combination set forth in claim 3 wherein said shot pins are spring biased outwardly toward an engaged position.

5. In a highway trailer of the lift bed type adapted to be coupled to a tractor, the combination comprising:
   a. a liftable main frame having a lowered loading and unloading position and a raised transport position;
   b. a loaded pallet frame unit adapted to straddle said main frame;
   c. a subframe underlying said main frame and pivotally connected to same;
   d. a wheeled suspension underlying said subframe and adapted to serve as a ground support therefor;
   e. a gooseneck fixed to the forward end of said main frame and having a pair of longitudinal structural members and a pair of transverse structural members defining a jackbox opening therebetween;
f. a jackbox mounted within said opening for vertical sliding movement relative to said gooseneck, said jackbox being adapted for attachment to the tractor fifth wheel;
g. power lift means for moving said main frame and gooseneck between the lowered loading and unloading position and the raised transport position; and
h. a pair of power actuated shot pins mounted in said jackbox in axially spaced relation with each other adapted to be projected outwardly therefrom in opposite directions to engage said gooseneck structural members and positively lock said gooseneck in raised transport position.

6. The combination set forth in claim 5, wherein said shot pins are spring biased outwardly toward an engaged position and retracted by power actuated means.

7. In a highway trailer of the lift bed type adapted to be coupled to a tractor, the combination comprising:
a. a liftable main frame having a lowered loading and unloading position and a raised transport position;
b. a loaded pallet frame unit adapted to straddle said main frame;
c. a subframe underlying said main frame and pivotally connected to same;
d. a wheeled suspension underlying said subframe and adapted to serve as a ground support therefor;
e. a gooseneck fixed to the forward end of said main frame and having a pair of longitudinal structural members and a pair of transverse structural members defining a jackbox opening therebetween;
f. a jackbox mounted within said opening for vertical sliding movement relative to said gooseneck, said jackbox being adapted for attachment to the tractor fifth wheel;
g. power lift means for moving said main frame and gooseneck between the lowered loading and unloading position and the raised transport position;
h. a pair of lift spacers mounted on said subframe for lateral sliding movement between an inboard or retracted position and an outboard or extended position;
i. a pair of opposed linear guide shoes fixed to each said lift spacer and engaging said subframe, said guide shoes permitting lateral sliding movement of said lift spacer but precluding longitudinal movement thereof; and
j. power actuator means for extending said lift spacers laterally against a positive stop to support said main frame in an elevated position.

8. In a lift bed highway trailer adapted for coupling to a tractor by means of a fifth wheel connection; the combination comprising:
a. a liftable main frame having a lowered loading and unloading position and a raised transport position;
b. a wheeled subframe underlying said main frame and pivotally connected to the same;
c. a gooseneck fixed to the forward end of said main frame;
d. a jackbox mounted within said gooseneck for vertical sliding movement relative thereto, said jackbox being adapted for attachment to the tractor fifth wheel;
e. power lift means for moving said main frame and gooseneck between the lowered loading and unloading position and the raised transport position;
f. a pair of lift spacers mounted on said subframe for lateral sliding movement between an inboard or retracted position and an outboard or extended position;
g. a pair of opposed linear guide shoes fixed to each said lift spacer and engaging said subframe, said guide shoes permitting lateral sliding movement of said lift spacer but precluding longitudinal movement thereof; and
h. power actuator means for extending said lift spacers laterally against a positive stop on said subframe to support said main frame in raised transport position.

9. The combination set forth in claim 8, wherein said subframe comprises side members and transverse members, and wherein each said pair of opposed linear guide shoes slidably engages a corresponding pair of said transverse members.

10. The combination set forth in claim 9, wherein said side members and transverse members of said subframe are of channel shaped cross section and said linear guide shoes slidably engage the top flanges of said corresponding pair of transverse members.

11. The combination set forth in claim 10, wherein the top flanges of said subframe side members serve as positive stops to locate said lift spacers in laterally extended position.

12. The combination set forth in claim 8, wherein each said lift spacer has a transverse notch in its central portion and another at its forward end to accommodate structural members on said liftable main frame when the latter is in lowered position.

13. In a highway trailer of the lift bed type adapted to be coupled to a tractor, the combination comprising:
a. a liftable main frame movable between a lowered position and an elevated position;
b. a gooseneck fixed to the forward end of said main frame having a pair of longitudinal structural members and a pair of transverse structural members defining a jackbox opening therebetween;
c. a first pair of bushings mounted in the jackbox opening and secured to respective ones of said structural members;
d. a jackbox mounted within said opening for vertical sliding movement relative to said gooseneck, said jackbox being adapted for attachment to the tractor fifth wheel;
e. power lift means for moving said main frame and gooseneck between the lowered position and the elevated position;
f. a second pair of bushings mounted in said jackbox and situated for registration with said first pair of bushings when said liftable main frame is in the elevated position;
g. a pair of shot pins slidably mounted in respective ones of said jackbox bushings;
h. a pair of rocker arms pivotally connected to respective ones of said shot pins;
i. a pair of biasing springs each connected between one said rocker arm and the jackbox and adapted to urge their associated shot pins outwardly; and
j. a pair of power actuators mounted within said jackbox and connected to respective ones of said rocker arms in opposition to said biasing springs, said actuators when energized being adapted to withdraw said shot pins into the jackbox.

14. The combination set forth in claim 13, wherein said first pair of bushings is connected to said transverse structural members of said gooseneck.

15. The combination set forth in claim 13, wherein said second pair of bushings is situated in said jackbox above the level of said gooseneck when said main frame is in the lowered position.

* * * * *